No. 757,017. PATENTED APR. 12, 1904.
F. BLOSSOM & W. A. HALLER.
MEASURING APPARATUS.
APPLICATION FILED DEC. 30, 1903.
NO MODEL.

WITNESSES:
Jessie B. Kay
Joseph J. Collins

INVENTORS
Francis Blossom &
Winfield A. Haller
by Duncan & Duncan ATTORNEYS

No. 757,017.

Patented April 12, 1904.

UNITED STATES PATENT OFFICE.

FRANCIS BLOSSOM AND WINFIELD A. HALLER, OF NEW YORK, N. Y.

MEASURING APPARATUS.

SPECIFICATION forming part of Letters Patent No. 757,017, dated April 12, 1904.

Application filed December 30, 1903. Serial No. 187,091. (No model.)

*To all whom it may concern:*

Be it known that we, FRANCIS BLOSSOM and WINFIELD A. HALLER, citizens of the United States, and residents of New York city, in the county and State of New York, have invented certain new and useful Improvements in Measuring Apparatus, of which the following is a specification, taken in connection with the accompanying drawings, which form a part of the same.

This invention relates to measuring apparatus, and relates especially to apparatus for measuring the displacement of variable-stroke pumping-engines and to apparatus for measuring the travel of devices having a variable reciprocating motion, such as elevators.

Figure 1:
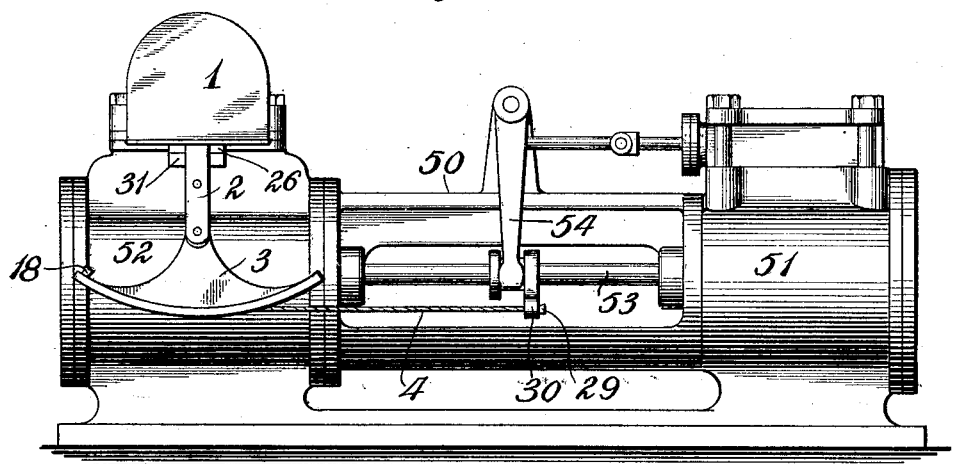
Figure 2:
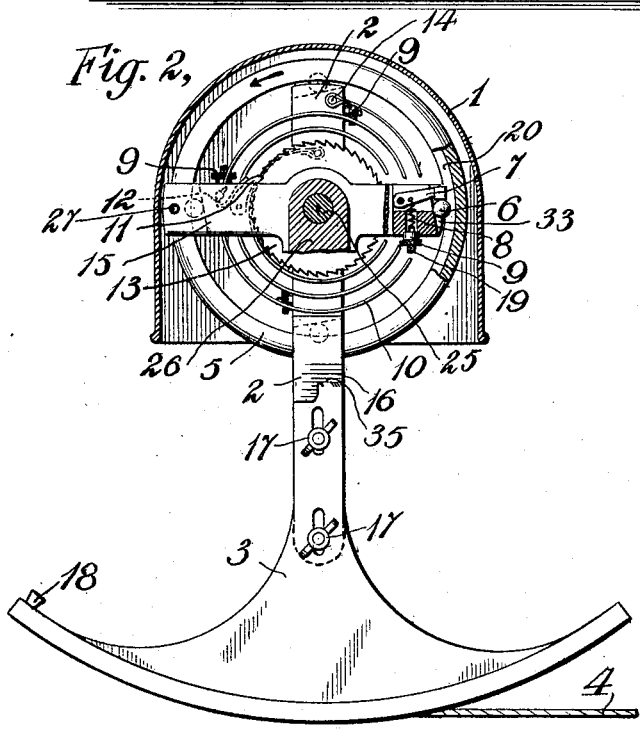
Figure 3:
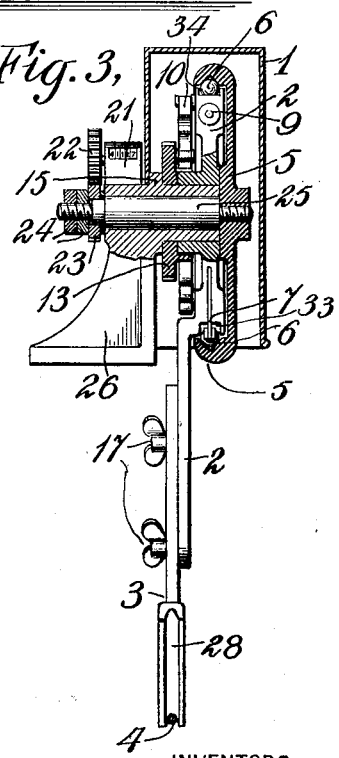

In the accompanying drawings, in which the same reference-numerals refer to similar parts in the several figures, Figure 1 is an elevation of an embodiment of this invention applied to a direct-acting pump. Fig. 2 is an enlarged elevation of this apparatus, parts being shown in section. Fig. 3 is a side sectional view of the same.

In the embodiment of the invention shown in the drawings a support 26 is preferably provided for mounting the measuring apparatus, and this support may be formed with the projecting sleeve 15, indicated. The shaft 25 is shown as mounted within this sleeve and has secured to one end the wheel 5. The gear 23 is secured to the other end of this shaft, the lock-nuts 24 being employed, if desired, and this gear coacts with a corresponding gear 22, which is connected to the indicator or counter 21, which gives an indication at all times of the number of revolutions which the shaft has made.

The oscillating driving-arm 2 is mounted upon the sleeve 15, so as to rotate freely, and the driving-spring 10 has a tendency to rotate this arm in one direction. This spring is connected at one end with the pin 14 on the arm, and its other end is similarly connected with the ratchet 13, mounted upon the sleeve and which may be held in any desired position by the coöperating catch 11, operated by the light spring 12. Suitable pawls or intermittently-acting clutches of any description may be provided on the driving-arm to coöperate with the wheel and to rotate the wheel to an extent equal to the sum of the rotative movements of the driving-arm in one direction. Pawls of any desired description may be used for this purpose, and in the drawings the wheel is indicated as provided with a suitable race 20, formed in the inner face of its laterally-projecting rim, and one or more balls 6 are mounted in suitable inclined grooves 33 in the arm and are preferably spring-pressed into coöperation with the race. These grooves may be formed, if desired, with the lateral flanges 34 to prevent displacement of the balls, and these flanges should preferably be spaced far enough apart to be normally out of contact with the balls during the operation of the device. As is indicated in the drawings, two oppositely-disposed balls are preferably mounted on the arm, one on either side of the shaft, and these balls are shown as engaged by the pivoted fingers 7, each of which is actuated by the light spring 8, secured to the rod 19, a suitable thumb-nut being provided to engage this rod and adjust the tension of the spring.

Any suitable means can be provided to prevent the backward rotation of the wheel as the driving-arm oscillates in a rearward direction. In the drawings suitable balls 6, similar to those mounted in the driving-arm, are mounted in the bar 15, secured to the support, and coöperate with the race in the wheel in a way similar to the driving-clutches, the wheel in this way being positively held against rearward rotation. The driving-arm, which is shown as provided with the sector 3, is preferably formed of adjustable length, the two parts being rigidly held in adjusted position by the adjusting-nuts 17. A suitable scale 16 may be formed on either side of the driving-arm, and the pointer 35, secured to the sector, coöperates with this scale and indicates the proper adjustment of the length of the arm for various operating conditions.

A suitable case 1 may be provided and may be secured to the support by any desired means, such as the securing bolts or screws 27. This support may be secured to the pump or other machine with which the apparatus is used in any desired way, in Fig. 1 the bracket 31 being indicated on the water-cylinder 52 of the direct-acting pump, to which the support 26 is secured. The steam-cylinder 51 of the pump is of usual construction, these cylinders having suitable pistons and being provided with the common piston-rod 53, which operates the valve-lever 54 in the usual way, the lever being pivoted to the frame 50 and operating the valve mechanism, as is well known in this art. The piston-rod 53 is shown as provided with a suitable lug 30, projecting outward into a position substantially tangent to the sector 3, and the cord 4 is secured to this lug by a suitable stud 29 and is secured in the end of the guide 28 in the sector-rim by a similar stud 18. Under these conditions the reciprocation of the piston-rod causes the oscillation of the sector and driving-arm, the angular movement of the arm being exactly proportional to the reciprocation of the pump-piston, the arm being positively rotated in one direction by the cord and being rotated in the other direction by the driving-spring 10. At every oscillation the driving-arm rotates the wheel by means of the driving-clutches through the same angle as the arm rotates in one direction, the grip of the clutches being released as the arm moves backward and the holding-pawls preventing rearward movement of the wheels. In this way as the pump operates the total amount of travel of the pump-plunger is accurately represented by the number of revolutions of the wheel, which is registered on the indicator, which may be constructed so as to give a direct reading in cubic-feet displacement or in lineal feet traveled, or, if desired, a suitable reduction factor may be used for computation. In case the fluid is of the same density the reading also represents the weight of the fluid pumped, and this is of course true regardless of the exact length of each stroke of the pump, so that no error is occasioned in case the pump-plunger reciprocates varying distances at different times. The adjustable-length driving-arm enables the apparatus to be readily adjusted, so as to compensate for any variation in density of the water or other fluid which is pumped, and the scale 16 may be formed to correspond with the temperature of water or other fluid upon which the pump may operate. In this way when the temperature of this water is known the length of the driving-arm may be adjusted to correspond, and thereupon the register of the indicator shows at once the number of pounds of water displaced by the pump, which is very desirable for many purposes.

It is of course understood by those familiar with this art that many modifications may be made in the form, proportion, and number of parts of this apparatus. Parts of the same may be used without employing the whole, and parts may be used in connection with other devices without departing from the spirit of this invention or losing the advantages of the same. We do not, therefore, desire to be limited to the details of the disclosure which has been made in this case; but

What we claim as new, and desire to secure by Letters Patent, is set forth in the appended claims:

1. In measuring apparatus, a support having a projecting sleeve, a shaft mounted within said sleeve, an indicator operated from said shaft, a wheel secured on said shaft and having a ball-race, an oscillating spring-pressed driving-arm mounted on said sleeve, a ball operating in an inclined groove in said arm and coöperating with said race, a spring-pressed finger to hold said ball in operative position, a holding-ball engaging said race, said driving-arm having a sector to be connected with a pump-piston and said arm being of adjustable length to compensate for the density of the fluid pumped.

2. In measuring apparatus, a support, a shaft mounted in said support, an indicator operated from said shaft, a wheel secured upon said shaft, an oscillating driving-arm adjacent said wheel, a driving-spring having an adjusting-ratchet and secured to said arm, a clutch on said arm to engage said wheel and to rotate the same in unison with said arm in one direction, said arm having means to be connected with a pump-piston and being of adjustable length to compensate for the density of the fluid pumped.

3. In measuring apparatus, an indicator, an oscillating arm adjacent said indicator, means connecting said indicator and driving-arm to operate said indicator when said arm rotates in one direction, and means normally tending to rotate said arm in one direction, said driving-arm having means to be connected with a displacement device and being formed with adjusting means to compensate for the density of the displaced fluid.

4. In measuring apparatus, a shaft, an indicator operated from said shaft, an oscillating driving-arm adjacent said shaft, intermittently-gripping means on said arm to rotate said shaft in unison therewith in one direction, said arm being provided with a sector to be connected with a displacement device and being of adjustable length to compensate for the density of fluid displaced.

5. In measuring apparatus, a support having a projecting sleeve, a shaft mounted within said sleeve, an indicator operated from said shaft, a wheel secured to said shaft and provided with a laterally-projecting rim, an oscillating driving-arm mounted on said sleeve adjacent said wheel, a driving-spring secured to said arm and connected with a ratchet mounted on said sleeve, a catch to hold said ratchet in adjusted position and an intermittent grip-clutch on said arm engaging the inner face of said rim.

6. In measuring apparatus, a support having a projecting sleeve, a shaft mounted within said sleeve, an indicator operated from said shaft, a wheel secured to said shaft and provided with a laterally-projecting rim, an oscillating driving-arm mounted on said sleeve adjacent said wheel, a driving-spring secured to said arm and connected with a ratchet mounted on said sleeve, a catch to hold said ratchet in adjusted position, a ball mounted in a groove in said arm and coöperating with a race formed in the inner face of said rim, and a pivoted spring-pressed finger engaging said ball and holding the same in operative position.

7. In measuring apparatus, a support having a projecting sleeve, a shaft mounted within said sleeve, an indicator operated from said shaft, a wheel secured to said shaft and provided with a laterally-projecting rim, an oscillating driving-arm mounted on said sleeve adjacent said wheel, a driving-spring secured to said arm and connected with a ratchet mounted on said sleeve, a catch to hold said ratchet in adjusted position, a plurality of oppositely-disposed balls mounted in said arm and engaging the inner face of said rim and means to prevent the rotation of said wheel in one direction.

8. In measuring apparatus, a support having a projecting sleeve, a shaft mounted within said sleeve, an indicator operated from said shaft, a wheel secured to said shaft and provided with a laterally-projecting rim, an oscillating driving-arm mounted on said sleeve adjacent said wheel, a driving-spring secured to said arm and connected with a ratchet mounted on said sleeve, a catch to hold said ratchet in adjusted position, a plurality of oppositely-disposed balls mounted in said arm and engaging the inner face of said rim and a ball coöperating with the inner face of said rim to prevent rotation of said wheel in one direction.

9. In measuring apparatus, a shaft, an indicator operated from said shaft, an oscillating driving-arm adjacent said shaft, intermittently-gripping means on said arm to rotate said shaft in unison therewith in one direction, said arm being of adjustable length to compensate for the density of fluid displaced and means to connect said arm with a displacement device and to oscillate said arm through an angle proportionate to the amount of fluid displaced.

FRANCIS BLOSSOM.
    WINFIELD A. HALLER.

Witnesses:
 HARRY L. DUNCAN,
 JESSIE B. KAY.